May 11, 1937. E. HORN Re. 20,363

RATE OF CLIMB INDICATOR

Original Filed Sept. 9, 1935

Inventor;
E. Horn,
Glascock Downing & Seebold
By Attys.

Reissued May 11, 1937

Re. 20,363

UNITED STATES PATENT OFFICE 20,363

RATE OF CLIMB INDICATOR

Erhard Horn, Leipzig, Germany

Original No. 2,056,354, dated October 6, 1936, Serial No. 39,822, September 9, 1935. Application for reissue March 3, 1937, Serial No. 128,873. In Germany September 22, 1934.

3 Claims. (Cl. 264—1)

This invention relates to a device for indicating the climbing speed and rate of vertical descent of an aircraft.

The object of the invention is the provision of a device of this character in which the indicating pointer is instantaneously responsive to variations in the ascent and descent of aircraft.

According to the invention the measuring principle is based on the measurement of the pressure difference produced during the ascent and descent of the aircraft, between the outside air and the air contained in a vessel in communication with the outside air through a small orifice. The measurement of this pressure difference is not, however, effected by means of a diaphragm box as in prior types of rate of climb indicators, but by means of a pressure plate instrument.

In the accompanying drawing wherein an improved embodiment of the invention is illustrated, Figure 1 is a front elevation of the indicator with parts removed.

Figure 1:
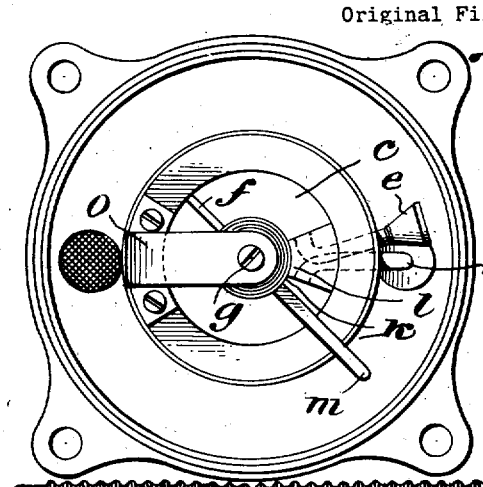
Figure 3:
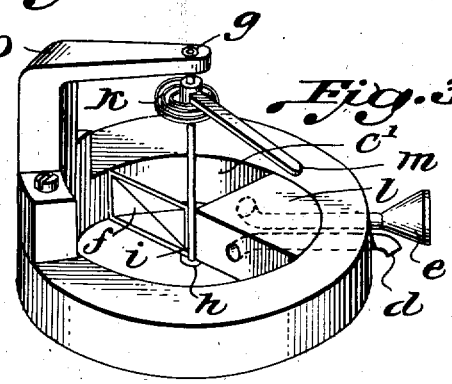
Fig. 3 is a perspective view of the indicator removed from the housing and showing the internal parts thereof.
Figure 3:
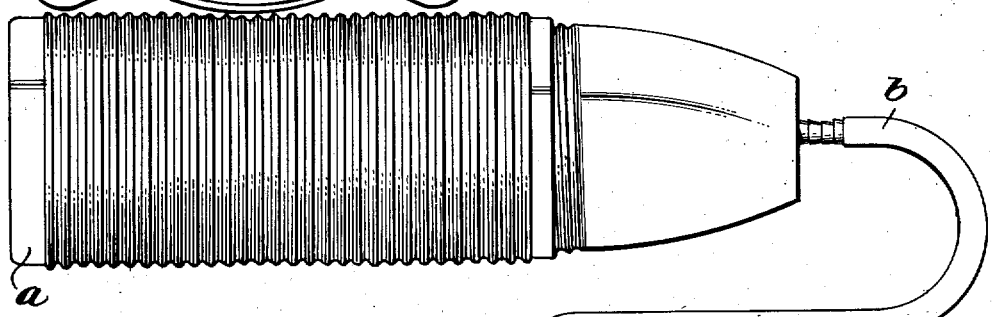
Figure 2:
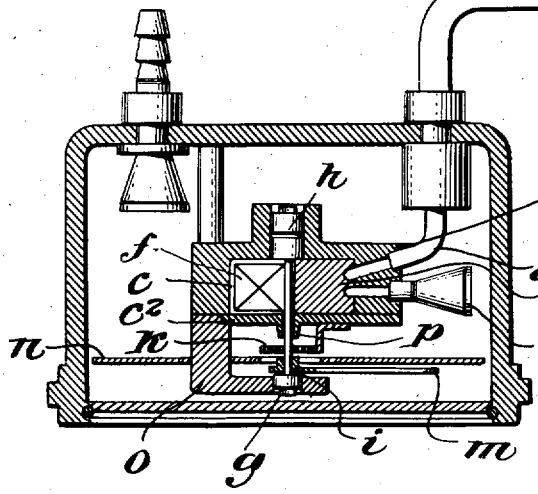
Fig. 2 is a transverse section through the indicator showing the connection of the latter with an air reservoir.

Referring to the drawing in detail *a* designates an air reservoir of approximately half a liter capacity which is protected against the influences of changing temperature by the well known double walled covering.

The reservoir *a* is connected by a pipe *b* with a circular air chamber *c* provided in the body $c_1$ of the indicating device, the open top of the chamber being normally closed by a cover $c_2$.

A pressure plate *f* rigidly secured to the supporting shaft *i* is located in the air chamber *c* and is normally held in a predetermined position by a spring *k*.

The shaft *i* is mounted to freely rotate in bearings *g* and *h* provided respectively in the body $c_1$ and a bearing arm *o* supported thereby. The cover $c_2$ is provided with an opening *p* through which the shaft *i* passes and a pointer *m* is rigidly secured to the shaft *i* and is movable over the plate *n* having the usual graduated scale thereon.

The body $c_1$ is provided internally with a sector-shaped partition wall *l* extending from the annular wall of the chamber *c* into close relation to the shaft *i*, the wall *l* being disposed opposite to the normal position of the pressure plate *f*.

The portion of the chamber *c* at one side of the pressure plate *f* communicates with a port *d*, which, as above stated, is in communication with the reservoir *a* through the pipe *b*. At the opposite side of the pressure plate *f*, the chamber *c* is in communication with a port *e* communicating with the outside air.

The shaft *i* is located at the center of the circular chamber *c* and the pressure plate *f* is of such dimensions as to provide a clearance space or capillary gap of about one-tenth millimeter on all sides thereof between it and the walls of said chamber. Approximately the same clearance space is afforded between the shaft *i* and the partition wall *l*.

When the aircraft ascends, the atmospheric pressure decreases in accordance with the rate of climb of the aircraft. The air contained in the reservoir *a*, therefore, flows outwardly therefrom and since it can only follow the path over the clearance space or gap between the wall of the chamber *c* and the pressure plate *f*, said plate is moved against the tension of the spring *k* to an extent corresponding to the velocity of the air which, as will be understood, depends upon the prevailing difference between the air in the reservoir and the outside air.

A pressure difference between the air within the reservoir *a* and the outside air occurs whenever the aircraft ascends or descends and the equalization of these pressures can only be effected by the passage of air through the space or gap between the pressure plate *f* and the wall of the chamber, said gap, according to its shape, constituting a flat plate opening, comparable with a capillary tube. Since, however, said air gap corresponds to a very wide capillary opening and also since the spring *k* has no lag like that of a diaphragm box, the pointer is adjusted to the measuring value much more quickly than in the known types of rate of climb indicators employing diaphragm boxes.

A further advantage of the improved indicator lies in the fact that the mechanism can withstand substantially any pressure, that is to say, it has an overload capacity as compared with the type of climb indicators having diaphragm boxes.

A further advantage lies in the fact that the pressure plate *f* and shaft *i* are of small weight and in the consequent ability of these parts to withstand shocks.

What is claimed is:

1. A rate of climb indicator comprising a thermally insulated reservoir, a circular chamber, a stationary partition wall arranged in said chamber, a shaft rotatably mounted in the axis of said chamber, a pressure plate rotatable with said shaft in said chamber, spring means normally retaining said pressure plate in predetermined position, means connecting said chamber at one side of said pressure plate with said reservoir, means connecting said chamber at the opposite side of said pressure plate with the atmosphere, said pressure plate being arranged to provide a gap between the edges thereof and the walls of said chamber, the dimensions of said gap being such that it serves as a capillary orifice whereby upon occurrence of a pressure difference between the atmospheric air and the air in said reservoir, said plate moves in response to said pressure difference, the flow of air through said gap causing equalization of the pressures on the two sides of said plate, and indicating means actuated by movement of said plate and shaft.

2. A rate of climb responsive device comprising a reservoir, a circular chamber, a partition in said chamber, a shaft rotatably mounted in said chamber, a pressure plate rotatable with said shaft in said chamber, means normally retaining said pressure plate in a predetermined position, means connecting said chamber at one side of said pressure plate with said reservoir, and means connecting said chamber at the opposite side of said pressure plate with the atmosphere, said pressure plate being arranged to provide a gap between an edge thereof and a wall of said chamber, the dimensions of said gap being such that it serves as a capillary orifice, whereby upon occurrence of a pressure difference between the atmospheric air and the air in said reservoir, due to a change in altitude, said plate moves in response to said pressure difference, the flow of air through said gap causing equalization of the pressures on the two sides of said plate.

3. A rate of climb indicator comprising means providing a chamber, means providing a second chamber, a pressure actuated member movably mounted in said second chamber, means normally retaining said pressure member in a predetermined position, said second chamber being in communication with said first chamber at one side of said pressure member and in communication with the atmosphere at the other side of said pressure member whereby a difference in pressure occurs on the two sides of said member upon a change in altitude, said pressure member forming a capillary gap between an edge thereof and a wall of said second chamber, whereby said member is actuated upon occurrence of a pressure difference on the two sides of said member due to a change in altitude and air is caused to flow through said gap to cause equalization of the pressures on the two sides of said member, and indicating means actuated by said pressure member.

ERHARD HORN.